United States Patent
Phillips (10) Patent No.: US 6,805,846 B2
(45) Date of Patent: Oct. 19, 2004

(54) COMPACT REACTOR CAPABLE OF BEING CHARGED WITH CATALYTIC MATERIAL FOR USE IN A HYDROGEN GENERATION/FUEL CELL SYSTEM

(75) Inventor: Cory Phillips, Columbus, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 256 days.

(21) Appl. No.: 09/883,682

(22) Filed: Jun. 18, 2001

(65) Prior Publication Data

US 2003/0016638 A1 Jan. 23, 2003

(51) Int. Cl.[7] .............................. B01J 8/00; F28D 9/00
(52) U.S. Cl. ...................... 422/198; 422/190; 422/196; 422/211; 422/220
(58) Field of Search ................................. 422/187–191, 422/193, 196, 197, 198, 200; 423/655, 656

(56) References Cited

U.S. PATENT DOCUMENTS

| | | | | |
|---|---|---|---|---|
| 3,615,217 A | * | 10/1971 | Brien et al. | 423/656 |
| 3,909,299 A | * | 9/1975 | Corrigan | 422/190 |
| 4,142,988 A | * | 3/1979 | Chinchen | 252/373 |
| 5,209,906 A | * | 5/1993 | Watkins et al. | 422/200 |
| 5,270,127 A | * | 12/1993 | Koga et al. | 429/17 |
| 5,458,857 A | * | 10/1995 | Collins et al. | 422/198 |
| 5,580,523 A | * | 12/1996 | Bard | 422/50 |
| 6,190,623 B1 | * | 2/2001 | Sanger et al. | 422/192 |

* cited by examiner

Primary Examiner—Hien Tran
Assistant Examiner—Jennifer A. Leung
(74) Attorney, Agent, or Firm—Porter Wright Morris & Arthur LLP (57) ABSTRACT

A reactor module having one or more than one heat exchanger, a chamber block capable of being charged with a catalyst, and a platform are assembled in a unit in which separate fluid flows of reactants and heat media are directed by manifolds and ducts intrinsically formed in the module. Multiple reactor modules may be interconnected to form a further reactor module unit and the interconnected reactor units may in turn be configured for a large system with a high power rating.

33 Claims, 9 Drawing Sheets

COMPACT REACTOR CAPABLE OF BEING CHARGED WITH CATALYTIC MATERIAL FOR USE IN A HYDROGEN GENERATION/FUEL CELL SYSTEM

BACKGROUND OF THE INVENTION

The present invention relates to a micro component reactor module useful with a hydrogen generation system that provides a source of hydrogen for a fuel cell. Hydrogen fuel cells are non-polluting and highly efficient power sources (e.g., *FUEL CELLS GREEN POWER,* Los Alamos National Laboratory, U.S. Department of Energy. (1999) that are being developed for use in automotive, mobile and personal use applications having predetermined power output requirements where mobile, convenient, safe and compact power units are required.

It is an object of the invention to provide a water gas shift (WGS) reactor module for a process used to produce hydrogen gas for powering a fuel cell used in the foregoing applications.

It is an object of the invention to provide a reactor module for a gas processing unit operation in a hydrogen generation system used with a fuel cell or fuel cell stack. In a preferred embodiment, it is an object to provide a reactor module useful with a steam reforming process that generates hydrogen for powering hydrogen fuel cells in automotive, mobile, personal use and other predetermined discrete power requirement applications.

It is a further object to provide a reactor module that may be ganged in parallel, or provided in a battery of units, to provide an assembly in which total aggregate output is a multiple of the individual units assembled.

BRIEF SUMMARY OF THE INVENTION

In the invention, one or more heat exchangers and a chamber block with open volumes (or chambers) capable of being charged with a catalyst are assembled in a modular unit that includes an inlet and an outlet for reactant products. The chamber block includes one or a plurality of longitudinal cavities (chambers) that may be filled with a catalyst through which fluid flow is directed. Micro channel heat exchangers having laminar fluid flow pathways are aligned in the unit to provide operative interconnection to the catalyst filled chambers (catalyst chambers) in the chamber block. An enclosure having appropriate inlet and outlet orifices for the components defines a modular assembly used in a stage of the hydrogen producing/fuel cell system.

In the invention, the reactor catalyst filling the chamber may be a powder and/or particulate with a nominal particle size ranging from about 125 microns to about 3 millimeters. In general, catalysts useful in the invention include those composed of mono-, bi-, and poly-metallic alloys and oxides of IIIB including rare earth metals and the noble metals and transition metal groups. Other groups include the alkali metal families IA, IIA and IVA and Sb, Te, Bi, and Se.

The chamber block cavities charged with catalyst form a micro-component reactor; the overcall catalyst volume, and in turn, the number of chambers and their dimensions which determine chamber block size, for a given power specification may be differently configured.

In the operation of an embodiment, the reactor temperature is in the design range of approximately 250 degrees Celsius to approximately 650 degrees Celsius and reactant flow is at a predetermined pressure of less than approximately 3 atmospheres. Individual reactor modules may be sized for fuel cell systems with capacities such as 0.65 kW, 1.25 kW, or 5 kW. Reactor modules may be interconnected in gangs or batteries to form modules in which the reactant product flows of individual units are exhausted through a common orifice.

The invention is described more fully in the following description of the preferred embodiment considered in view of the drawings in which:

DETAILED DESCRIPTION OF THE INVENTION AND THE PREFERRED EMBODIMENTS

In the invention, one or more heat exchangers and a chamber block having defined open volumes therein, capable of being charged with a catalyst, are assembled as a unit. In a longitudinal perspective of the chamber block, an inlet for the introduction of reactants is provided (on the rear side) and an outlet for the exit of reactant products is provided on the opposite (front) side. The chamber block includes one or more longitudinal open volumes, cavities, or chambers extending therethrough that may be filled with catalyst. One or more than one heat exchanger with micro channel pathways that direct laminar fluid flow on each side of a thin separator plate (a "HEX" unit) is aligned with the chamber block such that the HEX unit sufficiently heats or cools reactants introduced to the system to a predetermined temperature to promote the predetermined reaction, such as WGS or hydrocarbon steam reforming, in the catalyst charged cavities. The HEX units may heat or cool the reactants and or the chamber block.

The heat exchanger and the chamber block are assembled with a front and rear cover to create a defined fluid communication path, including a closed interior fluid pathway at the rear of the chamber block that communicates with an inlet to the one or more than one cavity formed in the chamber block.

The chamber block is disposed with regard to the one or more heat exchangers in a relationship in which an outlet of a heat exchanger is in communication with an inlet of a catalyst cavity in the chamber block. Reactant flow through the catalyst in the chamber block cavity is from rear to front and is directed by a manifold in the form of a defined space between a back cover and a rear wall of the chamber block. The preferred configuration is "U" shaped in which opposite sides of the "U" include orifices in operative correspondence with an inlet and an outlet of a heat exchanger and in which the orifices for fluid paths in the "U" connecting to the heat exchanger are formed in extending legs of the "U" in a direction transverse to the extending legs.

The reactor module sides form a polyhedron open on a side corresponding to the reactant outlet through the chamber block. The outlet side is covered by an exhaust plate which integrates flow from multiple chambers and directs the aggregate flow of product fluid reacted in the catalyst chambers to a single or plural common stream. One or more screen may be disposed on either side of the chamber block inlet and outlet faces between the exhaust cover to maintain the particulate catalyst in the chambers. The exhaust cover comprises a continuous single exit manifold interconnected with the cavity outlets.

In the preferred embodiment, the catalyst may be a powder with a nominal particle size of 125 microns, and in compact reactor modules of the invention, as the units are variously sized, catalyst particles may range to about approximately 450 microns, and to about 3 millimeters. One or more than one catalyst formulation may be loaded in the chamber. Catalysts useful in the invention include those composed of mono-, bi- and poly-metallic alloys and oxides of Group IIIB including rare earth metals (e.g., Sc, Y, La, Ce); Group IVB (e.g., Ti, Zr); Group VB (e.g., V, Nb, Ta); Group VIB (e.g., Cr, Mo, W); Group VIIB (e.g., Mn, Tc, Re); Fe, Co, Ni, Cu, Zn, Cd; and noble metals (e.g., Ru, Os, Rh, Ir, Pd, Pt, Ag, Au) and transition metal groups. Other groups include the alkali metal families, Group IA and Group IIA (e.g., Li, Na, K, Mg, Ca); Group IIIA (e.g., B, Al, Ga, In); Group IVA (C, Si, Ge, Sn, Pb); and Sb, Te, Bi and Se.

The preferred embodiment is a 1.25 kW unit in which the chamber block includes a 3×3 chamber matrix in which each cavity has a diameter of approximately 1 centimeter and a length of approximately 2.5 centimeters. Reactor operating temperature is in the range of about 250 degrees Celsius to about 650 degrees Celsius; reactants are received in the chambers at a pressure of less than 3 atmospheres; pressure drop through the chamber block is in the range of from about 0.5 to about 1.0 atmospheres. Individual reactor module units may be ganged or assembled in batteries such that the reactant products produced by each reactor module are exhausted through a common exit. Four 1.25 kW units may be staged in parallel to provide a "5 kW" unit (nominal) and ten such 5 kW units may be staged to provide a "50 kW unit" (nominal). The preferred embodiment herein is adapted for use particularly with the steam reformer fuel cell system described in co-pending application Ser. No. 09/803,592 filed on Mar. 9, 2001 and the preferred HEX units included in the module are described in co-pending application Ser. No. 09/627,267 filed Jul. 28, 2000. Both applications are owned by the assignee of the present application and are incorporated by reference herein as if set forth in full.

Figure 1A:
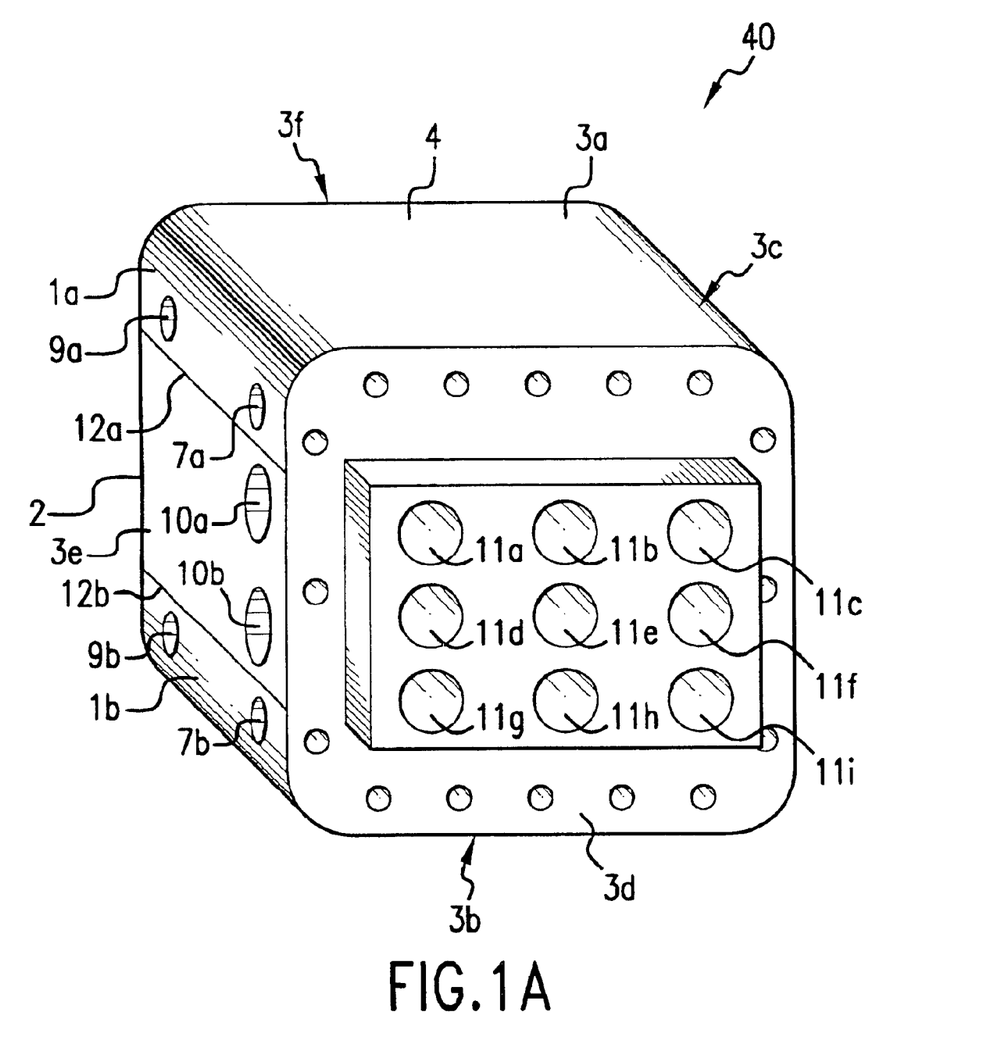
FIG. 1A is a perspective view of the reactor module of the present invention.
Figure 1B:
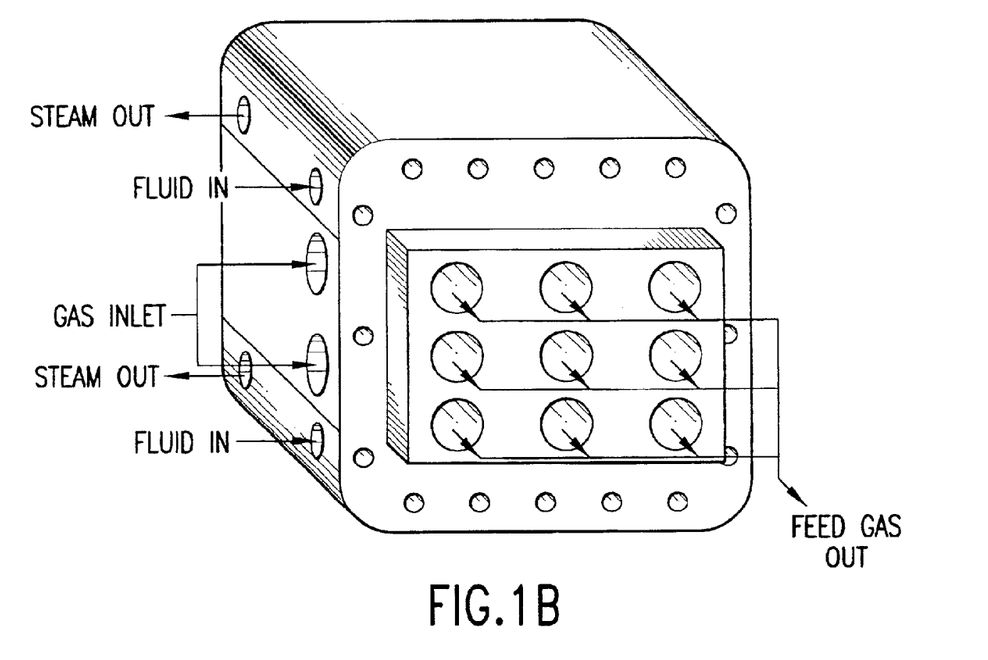
FIG. 1B shows a reactor module with inlets and outlets identified.
Figure 2A:
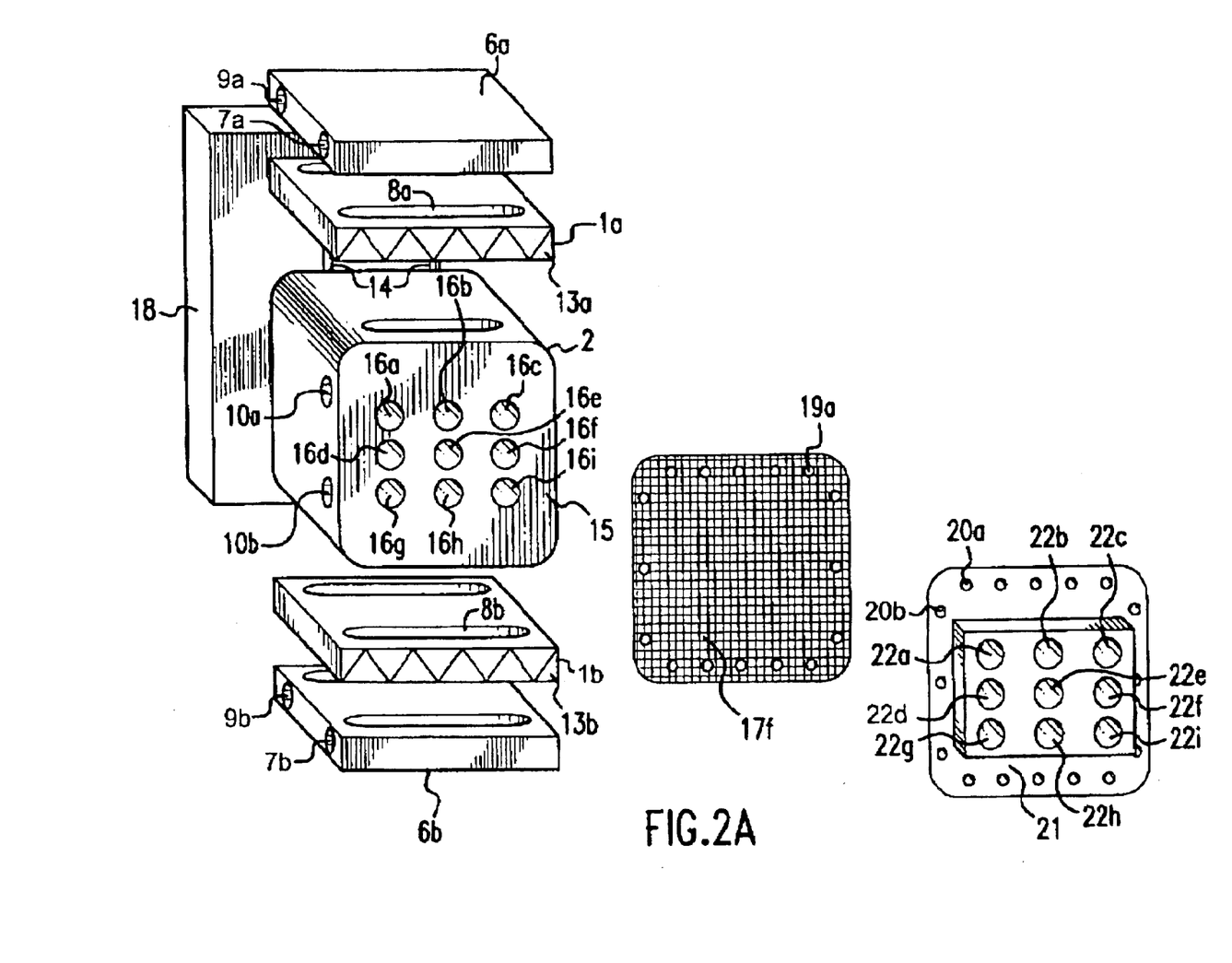
FIG. 2A is an exploded view of the reactor module showing its component assembly. The rear screen is not represented in this figure.
Figure 2B:
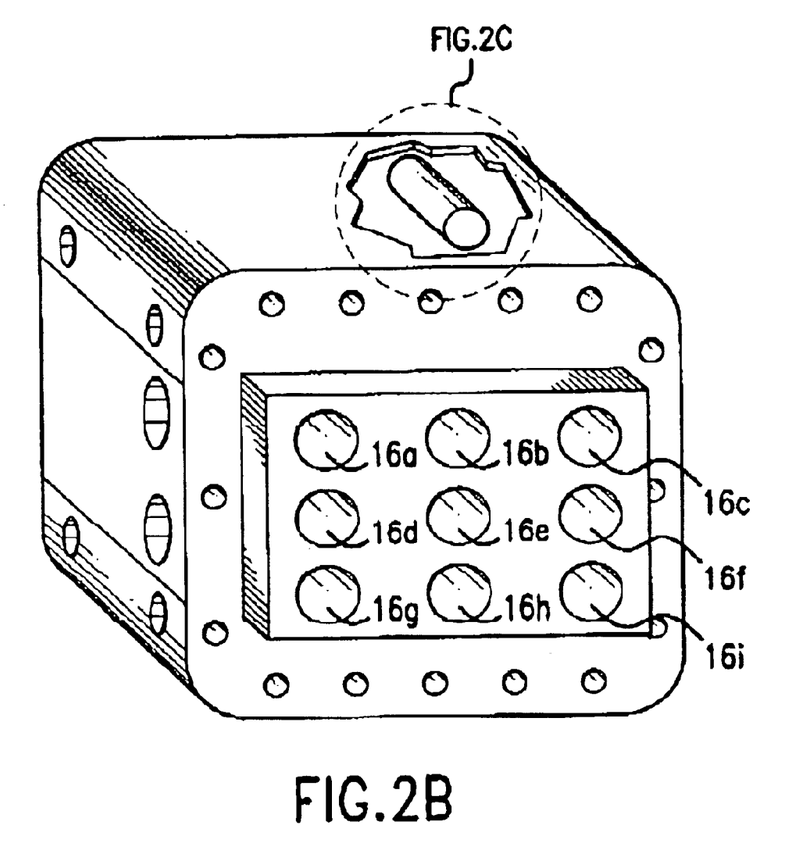
FIG. 2B depicts the reactor module with a cutaway view showing a chamber filled with catalyst.
Figure 2C:
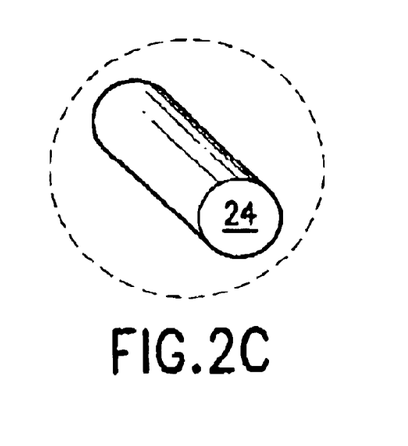
FIG. 2C is a detail view showing a chamber filled with catalyst.

Referring to FIG. 1A, reactor module 40 includes heat exchangers 1a and 1b and a chamber block 2 in a compact micro component assembly. The reactor module 40 preferably has a top face 3a, bottom face 3b, side faces 3c, and 3e, front exhaust face 3d and rear face 3f, all formed from a thermally conductive material, such as metal. Faces 3a, 3b, 3c, 3d, 3e, 3f form an enclosure 4, which in a 1.25 kW embodiment comprises a six-sided polyhedron 75 mm in width, 90 mm in height, and up to 70 mm in depth. The reactor module 40 includes thermally conductive plates 6a, 6b stacked with heat exchangers 1a and 1b and the chamber block 2 as shown in FIG. 1A and FIG. 2A. Dimensions may vary according to numerous process parameters, such as catalyst, the hydrocarbon being reformed, flow rate, residence time, nominal power rating and others.

The reactor module 40 includes inlets 7a and 7b on the plates 6a and 6b that are in fluid communication with the inlet ports 8a and 8b of the heat exchangers 1a and 1b and outlets 9a and 9b for steam. Inlets 7a and 7b may also accommodate low-grade steam. The heat necessary for the process may be supplied internally by partial oxidation or steam reforming of hydrocarbon fuel or supplied externally by a remote heat source. The reactor module 40 is constructed to operate under high internal temperatures; gas shift reactions occur in the range of 250° Celsius to 650° Celsius. The chamber block 2 has one or more inlets 10a and 10b for reactants and one or more outlets 11a, 11b, . . . 11x for reactant products. Heat exchangers 1a and 1b are located on the top and bottom of the chamber block 2.

The enclosure 4 of the reactor module 40 is preferably gas-tight. In an embodiment, the reactor exhaust face 3d (exhaust cover 21 in FIG. 2A) is detachably mounted to the gas-tight assembly forming a polyhedron structure with the five remaining faces 3a, 3b, 3c, 3e, 3f of the polyhedron. The side faces 3c and 3e of the reactor module 40 have weld lines 12a and 12b where the heat exchangers 1a and 1b are joined to the chamber block 2. The gas-tight enclosure 4 is suitable for pressurized operation of the reactor module 40 at a controlled level below 3 atm. The chamber block 2 is spaced apart from the rear inside wall 18 of the gas-tight enclosure 4. The spacing may be facilitated by one or more shim 14. The chamber block 2 is a solid 15 with one or more than one cavity 16a, 16b, . . . 16i that may be formed by boring, machining, casting or other process. Ports in the chamber block correspond to ports in the heat exchangers. The pathways of the fluid and reactant are depicted in FIG. 2A.

Figure 1C:
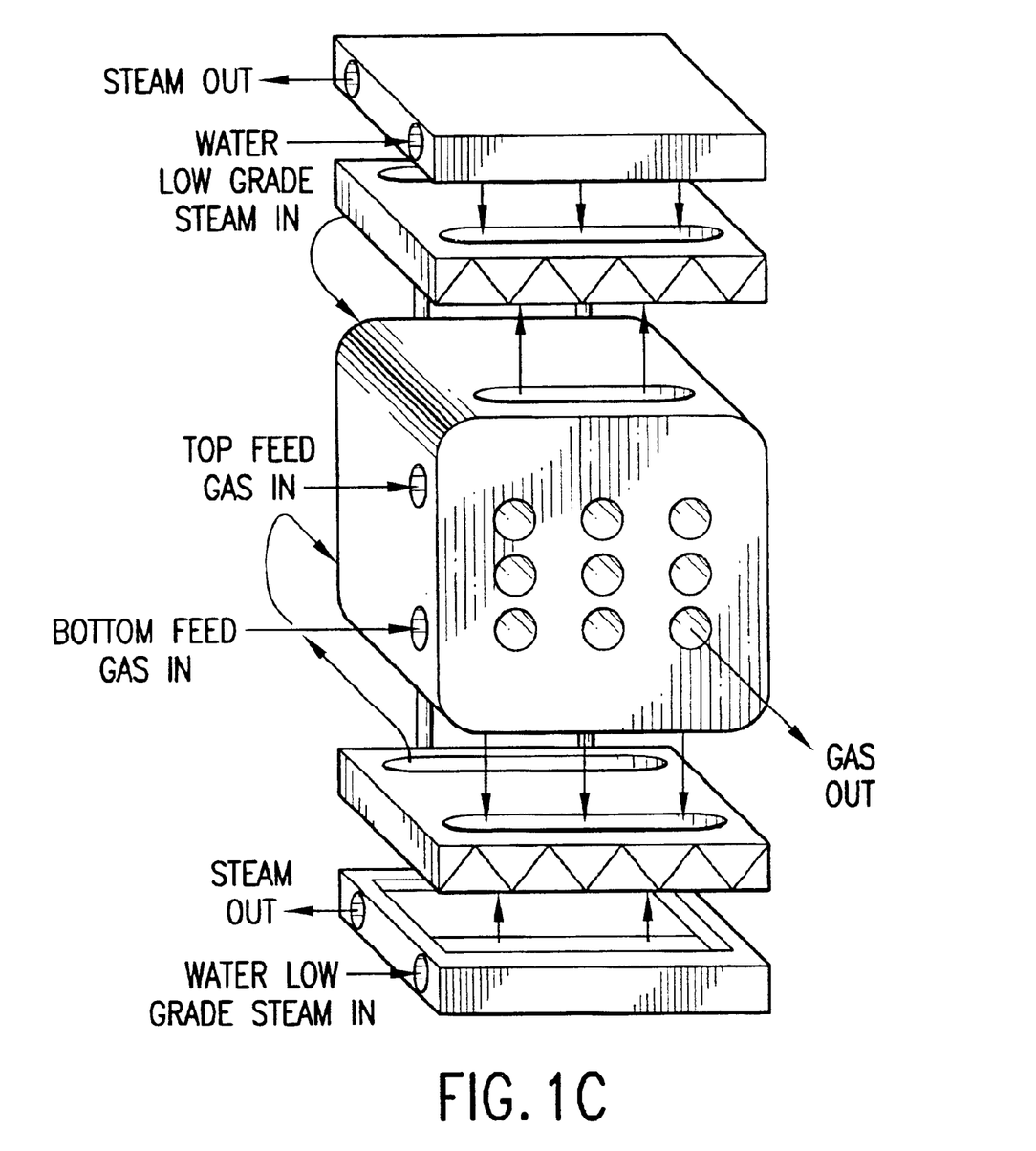
FIG. 1C is an exploded view of heat exchangers and a chamber block only, showing the fluid and reactant internal flow paths.

FIG. 1C shows a chamber block 2 in a stacked configuration with two heat exchangers 1a and 1b in an exploded view. The heat exchangers 1a and 1b comprise a micro channel configuration 13a and 13b adapted to induce laminar fluid flow on opposite sides of a separator plate as described in the aforementioned application for patent Ser. No. 09/627,267 filed on Jul. 28, 2000 and owned by the assignee of the present application.

The pathway opf reactant flow, depicted as feed gas, is shown in FIG. 1C. With reference to the elements of the reactor shown in FIG. 2A, the feed gas enters the top or bottom inlet 10a, 10b and passes to the one or more than one heat exchanger 1a, 1b. The feed gas flows through the heat exchanger 1a, 1b where it exits at the interior rear portion of the polyhedron. THe feed gas then enters the a chmber 16a, etc., passes the catalyst 24, exits the front of the chamber block 2, and is exhausted through one or more oulet 11a, etc.

The pathway of fluid, depicted as water/low grade steam, is also shown in FIG. 1C. With reference to the elements of the reactor shown in FIG. 2A, fluid passes through an inlet 7a, 7b into one or more heat exchanger 1a, 1b and exits as steam through an outlet 9a, 9b.

Figure 1D:
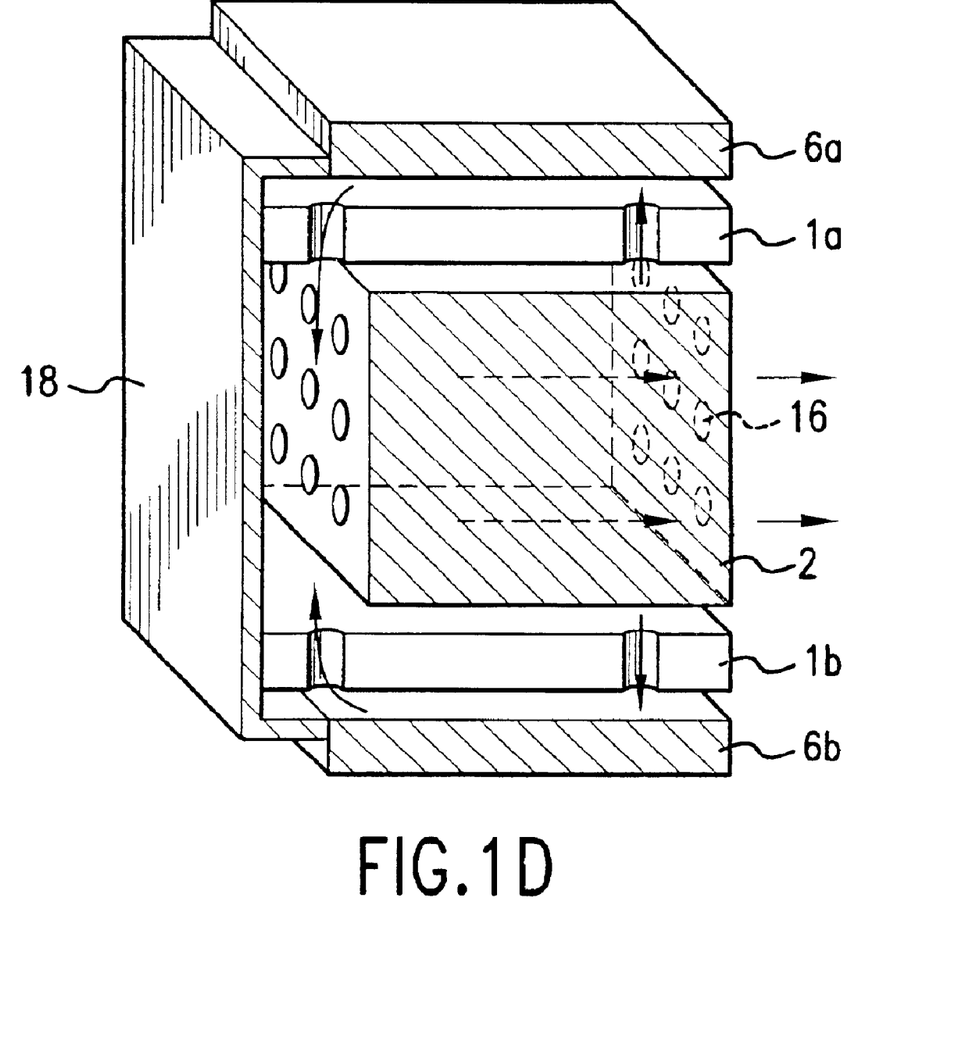
FIG. 1D is a side view of the reactor module showing internal reactant flow paths.

FIG. 1D shows the reactor module in a side cut away view. The reactants are shown flowing into sections of the heat exchangers 1a, 1b, exiting, and entering the rear of the chamber block 2 to pass through the catalyst 24 and exit through an outlet 11 from the front of the chamber block 2.

Figure 1E:
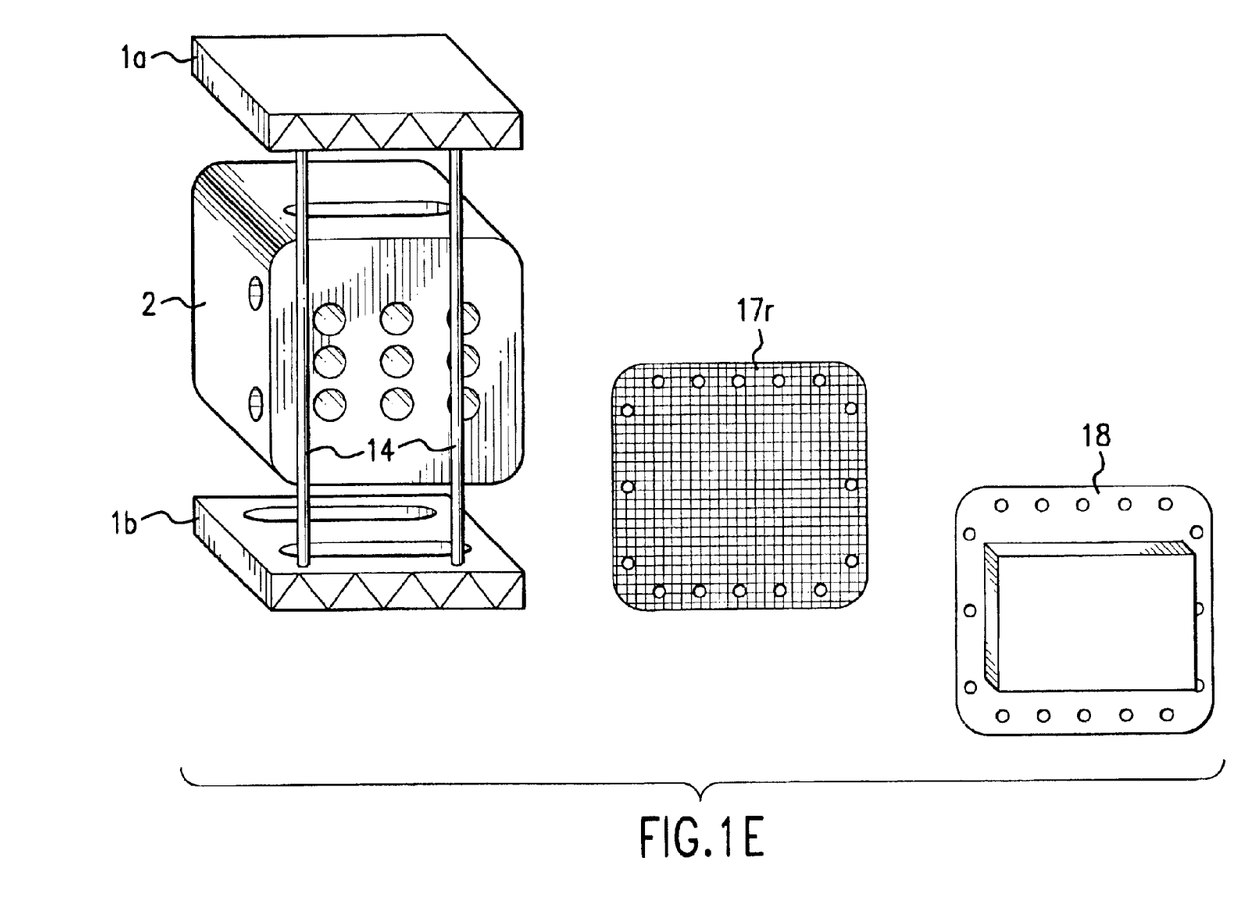
FIG. 1E is an exploded view of the rear of the heat exchangers and chamber block only, showing the configuration of shims and placement of rear screen and back cover.

FIG. 1E is an exploded view of the rear of the reactor module 40. Shims 14 maintain the space at the rear of the chamber block 2 to allow reactant to flow to the inlets for the chambers 16a, etc. A screen 17r maintains the catalyst 24 in the chambers 16a, etc. A rear cover 18 completes the gas-tight reactor module 40.

In the example shown in FIG. 2A, the chamber block 2 includes nine cavities 16a, 16b, . . . 16i in a three row by three column arrangement in which the cavities are cylindrical in shape; other geometric shapes defining comparable volumes and allowing comparable flow would function similarly. The cavities may be filled with catalyst 24, comprising a solid or porous material. In a high temperature shift (HTS) reactor, preferred catalysts include Fe—Cr—Al, iron-chromium-aluminum and CoMoAl, cobalt-molybdenum-aluminum oxide. In a low temperature shift (LTS) reactor, preferred catalysts include Cu—Zn—Al (copper-zinc-aluminum) and NM—CeOx (Noble metals, platinum, palladium and gold with cerium oxide) as well as transition metal (e.g., Mo, W, V) carbides and nitrides, palladium or a palladium alloy, and other hydrogen-selective metals. These materials can be arranged according to the temperature profile in the reactor block channels.

In general, catalysts useful in the invention include those composed of mono-, bi- and poly-metallic alloys and oxides of Group IIIB including rare earth metals (e.g., Sc, Y, La, Ce); Group IVB (e.g., Ti, Zr); Group VB (e.g., V, Nb, Ta); Group VIB (e.g., Cr, Mo, W); Group VIIB (e.g., Mn, Tc, Re); Fe, Co, Ni, Cu, Zn, Cd; and noble metals (e.g., Ru, Os, Rh, Ir, Pd, Pt, Ag, Au) and transition metal groups. Other groups include the alkali metal families, Group IA and Group IIA (e.g., Li, Na, K, Mg, Ca); Group IIIA (e.g., B, Al, Ga, In); Group IVA (C, Si, Ge, Sn, Pb); Sb, Te, Bi and Se.

In various embodiments, the nominal granular size of the catalyst ranges from approximately 125 microns to approximately 3 millimeters in size with a conventional tolerance variation.

Table I sets out examples for various cavity configurations for a 1.25 kW reactor. Other embodiments may be configured to produce fuel sufficient for predetermined power modules, for example, as adapted to 0.65 kW or 5 kW fuel cell stacks.

TABLE I

| Cavity or Chamber Diameter (cm) | Volume (cc) | Flow rate (L/min) | Design matrix | Internal cavity volume (cc) | Volume 5 W (cc) | Volume 50 kW (L) |
| --- | --- | --- | --- | --- | --- | --- |
| 1 | 2 | 1 | 9 × 9 | 162 | 4008 | 40 |
| 2 | 7 | 5 | 4 × 4 | 112 | 1972 | 20 |
| 3 | 16 | 8 | 3 × 3 | 144 | 2200 | 22 |
| 4 | 28 | 19 | 2 × 2 | 112 | 1612 | 16 |
| 9 | 144 | 75 | 1 × 1 | 144 | 1844 | 18 |

Table I shows that multiple and different cavity configurations and flow rate parameters are possible for a given reactor module power parameter. A cavity diameter of 3 centimeters represents the preferred embodiment for a reactor in a 1.25 kW module. In the example of Table I, the number of catalyst chambers ranges from 1 to 81; cavity diameters range from 1.0 to 9.0 centimeters; reactor size and other operational parameters are in the ranges encompassed by the Table I specifications. In the preferred embodiment, to achieve the flow rate of 1 L/min, each chamber in the 3×3 matrix of 3.0 centimeter cavities in the chamber block should have a length no greater than 2.5 centimeters, correspondingly determining the length of the chamber block in which the chambers are formed, namely, no greater than 2.5 centimeters.

Referring to FIGS. 1E and 2A, the reactor module 40 includes one or more than one screen 17f, 17r which confines the catalyst in the chamber block 2. Although FIG. 2A depicts a screen 17f, 17r, alternative porous materials may be used, such as a metal screen or frit.

Figure 3A:
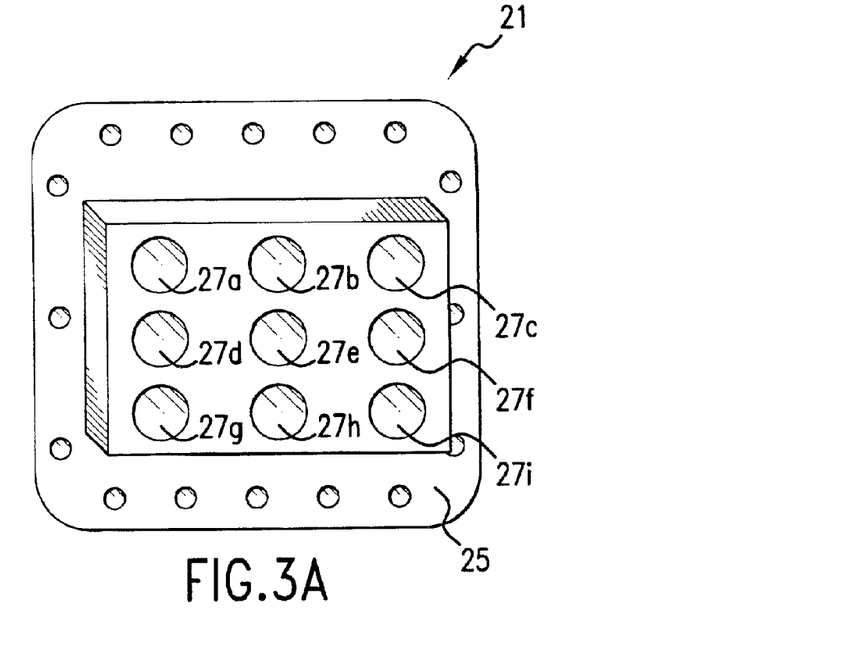
FIG. 3A and FIG. 3B show perspective views of exhaust manifolds for the reactor module.
Figure 3B:
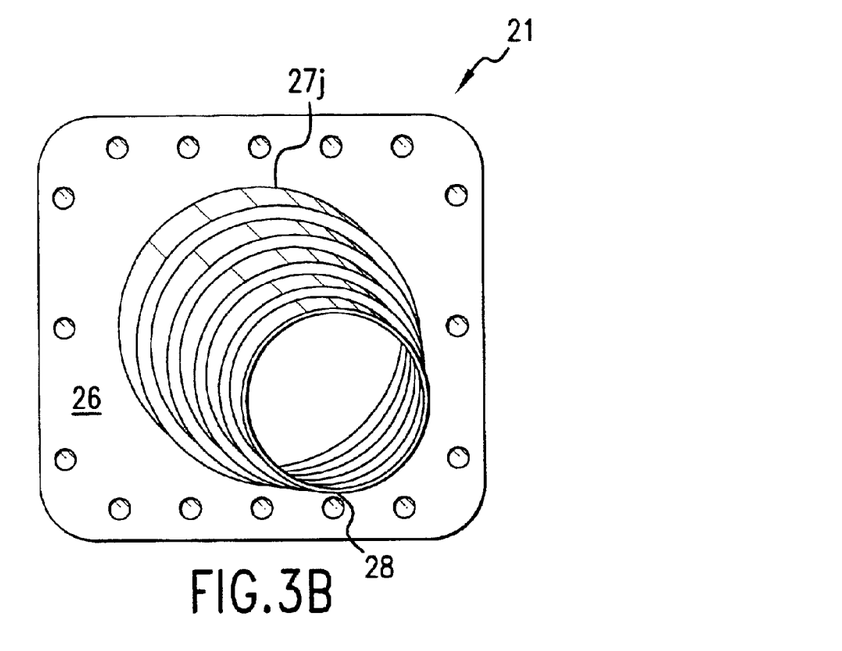

The one or more than one screen 17f, 17r includes openings 19a, 19b, . . . 19p to accommodate fasteners 20a, 20b, . . . 20p to secure the rear cover 18 or the exhaust cover 21 which may be fastened in alternative manners, such as welding or other fastening methods. The exhaust cover 21 shown in FIG. 2A includes openings 22a, 22b, . . . 22i in correspondence with each of the one or more than one cavity 16a, 16b, . . . 16x. FIGS. 3A and 3B show examples of exhaust covers 21. Referring to FIG. 3A, the exhaust cover 21 may be designed in a nine port exit exhaust manifold 25. In FIG. 3A, each opening 27a, 27b, . . . 27x corresponds to a cavity 16a, 16b, . . . 16x. FIG. 3B shows an exhaust cover 21 that comprises a continuous single exit exhaust manifold 26. The continuous single exit exhaust manifold 26 comprises an opening 27j sufficient to encompass the one or more than one cavity 16a, . . . 16b, 16x. The manifold 26 may taper continuously or regularly or irregularly incrementally in progressively smaller toward exhaust end 28.

Figure 4A:
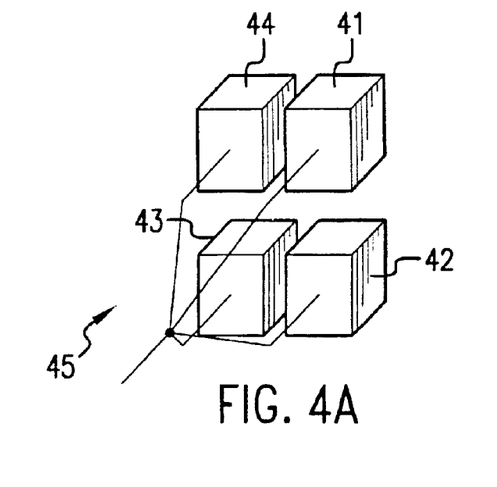
FIG. 4A shows an embodiment of four reactor modules configured in parallel to form a quad-reactor module.

FIG. 4A depicts an embodiment of four reactor modules 40 connected in parallel 41, 42, 43, 44 to form a reactor module 45, configured as a 5 kW (nominal rating) unit. In another embodiment, eight 0.65 kW reactor modules may be connected in parallel and configured as a 5 kW (nominal rating) unit.

Figure 4B:
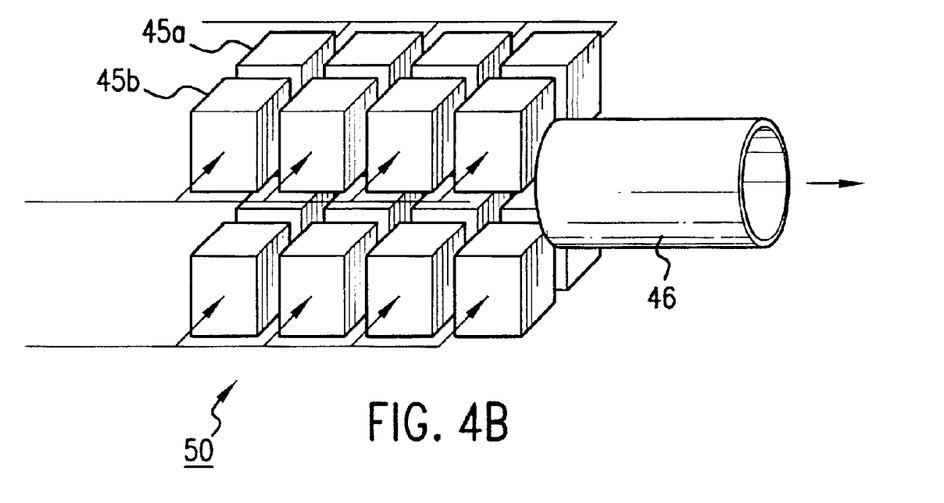
FIG. 4B depicts a plurality of quad-reactor modules further connected in parallel to form a large system configuration.

FIG. 4B shows the reactor module 45 of the preferred embodiment joined with further reactor modules 45a, 45b, etc. with a common exhaust 46 to form a large system configuration 50 for a large system, such as a motor vehicle.

In the invention, pressurized gas from an external source is supplied to a reactor module 40. Steam is generated from fluid entering heat exchangers 1a and 1b through inlets 7a and 7b; routed to a micro channel configuration 13a and 13b through inlet ports 8a and 8b; and exited by means of outlets 9a and 9b for steam. This steam is mixed with the pressurized gas to form a reactant and fed into the chamber block 2 at the inlets 10a and 10b at a level lower than 3 atm. The reactant may comprise a fuel comprising any one or more of $H_2O$, $O_2$, and $CO_2$. Fuels may be hydrocarbon, liquid aviation fuel, liquid alcohols, or compressed hydrocarbon gases.

In the preferred 1.25 kW embodiment, the reactant flows into the chamber block 2 at a rate of 75 L/min. for a total of 300 L/min for each individual reactor module unit. The drop in pressure of the reactant entering the reactor 2 to reactant products exiting the exhaust cover 21 is controlled.

Flow through the catalyst 24 in the cavities 16a, 16b, . . . 16x promotes the predetermined reaction, such as a water gas shift or steam reformation. Residence times vary depending upon the reactor dimensions and catalyst selection. Reactant residence time in the catalyst cavity 16a, etc. depends on cavity volume and ambient operating pressure in the system. In the preferred 1.25 kW embodiment, the pressure difference between the reactant entering the catalyst cavities 16 and reactant products exiting the chambers in the range of from approximately 0.5 atm to approximately 1.0 atm.

As an example of a reaction with which the reactor module may be used is the catalytic reformation of methane ($CH_4$) into a mixture of hydrogen, water, carbon monoxide and carbon dioxide. This mixture then exits through the exhaust cover by a pressure differential occurring between the chamber block inlet and the exhaust cover.

The dimensions of the reactor module 40 are compact. When working in conjunction with a primary reactor upstream operating as a pure hydrocarbon steam reformer or auto thermal reformer, an example of one reactor module 40 of the preferred embodiment herein produces between 10 mg/s and 20 mg/s of hydrogen which is sufficient to operate a 0.65–1.25 kW PEM-based fuel cell. Power is multiplied, for example, by interconnecting four reactor modules 40 in a parallel configuration as shown in FIG. 4A to create a reactor quad 45. Multiples of the reactor quads 45 may be further configured in parallel as shown in FIG. 4B to form a large system configuration 50 producing sufficient hydrogen to generate 50 kW in a fuel cell bank, energy sufficient to power a motor vehicle. The internal volume of a large system configuration 50 may range from approximately 16 L to 40 L. with a preferred embodiment of 22 L. The compact size of the present invention allows a fuel cell system to be adapted to be placed within the engine compartment of a motor vehicle.

Having described the invention in detail, those skilled in the art will appreciate that, given the present disclosure; modifications may be made to the invention without departing from the spirit of the inventive concept herein described. Rather, it is intended that the scope of the invention be determined by the appended claims.

What is claimed is:

1. A reactor comprising:
   an upper heat exchanger having first and second opposite sides for fluid flow on each side and an inlet and an outlet for fluid flow on each opposite side thereof, said upper heat exchanger being aligned with a chamber block in a relationship in which an outlet of the upper heat exchanger is in communication with a fluid flow inlet for a chamber block;
   a chamber block having an inlet on one side for the introduction of a fluid flow therein, an outlet on the opposite side for the exit of a fluid flow therefrom, and a plurality of longitudinally cavities extending therethrough from the inlet on one side to the outlet on the other side, the cavities being charged with a catalyst;
   a lower heat exchanger having first and second opposite sides for fluid flow on each side and an inlet and an outlet for fluid flow on each opposite side thereof, said lower heat exchanger being aligned with the chamber block in a relationship in which an outlet of the lower heat exchanger is in communication with a fluid flow inlet for the chamber block;
   a platform securing the upper heat exchanger, the chamber block, and the lower heat exchanger in a serial alignment;
   orifices for fluid flow in operative correspondence with the inlets and outlets of the heat exchangers; and
   a channel for fluid flow operatively disposed with respect to the platform to allow fluid flow from the outlets of the heat exchangers to the inlet of the chamber block.

2. The reactor of claim 1 including an exhaust cover enclosing the outlet of the chamber block.

3. The reactor of claim 1 including a screen disposed adjacent the inlet of the chamber block.

4. The reactor of claim 1 including a screen disposed adjacent the outlet of the chamber block.

5. An assembly of a plurality of the reactors of claim 1 connected in parallel such that fluid flow products produced by each reactor are exhausted through a common exit.

6. A system comprising a plurality of the assemblies of claim 5 connected in parallel such that the fluid flow products produced by each reactor are exhausted through a common exit.

7. A reactor in accordance with claim 1 in which cavities in the chamber block are charged with one or more than one catalyst selected from the group of copper-zinc-aluminum; noble metals, platinum, palladium and gold with cerium oxide; transition metal carbides; transition metal nitrides, palladium; palladium alloys, and hydrogen-selective metals.

8. A reactor in accordance with claim 1 in which cavities in the chamber block are charged with one or more than one catalyst selected from the group of Fe—Cr—Al and CoMoAl.

9. A reactor in accordance with claim 1 in which cavities in the chamber block are charged with catalyst selected from one or more than one of the group of mono-, bi-, and poly-metallic alloys and oxides of:
   Group IIIB; rare earth metals; noble metals; transition metals; alkali metal families; Group IA; Group IIA; Group IVA; Sb; Te; Bi; and Se.

10. A reactor comprising:
    a chamber block having an inlet for the introduction of reactants therein and an outlet for the exit of reactant products therefrom and one or more one than one longitudinal cavity, capable of being charged with a catalyst, extending therethrough from the inlet to the outlet;
    one or more than one heat exchanger having first and second opposite sides with micro channel pathways for fluid flow on each side, each heat exchanger having an inlet and an outlet in communication with the pathways on each opposite side thereof, said one or more than one heat exchanger being aligned with the chamber block in a relationship in which an outlet of the one or more than one heat exchanger is in communication with an inlet of the one or more than one cavity in the chamber block;
    a "U" shaped platform in which opposite sides of the "U" include orifices in operative correspondence with an inlet and an outlet of a heat exchanger, the platform securing the one or more than one heat exchanger and the chamber block in alignment and in which the bottom side of the "U" is spaced apart from the chamber block to define a closed interior channel operatively disposed to allow fluid flow from an outlet of the one or more than one heat exchanger to the inlet of the one or more than one cavity in the chamber block.

11. The reactor of claim 10 in which orifices in the opposite sides of the "U" are formed in the extending legs of the "U" in a direction transverse to the extending legs.

12. The reactor of claim 10 in which the sides of the platform form a polyhedron open on the side corresponding to a plane extending essentially perpendicularly with respect to the one or more than one outlet of the one or more than one cavity.

13. The reactor of claim 12 including an exhaust cover enclosing the open side of the polyhedron.

14. The reactor of claim 13 including a screen disposed between the plane formed by the one or more than one outlet of the one or more than one cavity and the exhaust cover.

15. The reactor of claim 13 including a screen disposed between the plane formed by the one or more than one inlet of the one or more than one cavity and the platform.

16. The reactor of claim 10 in which the one or more than one cavity includes a catalyst.

17. The reactor of claim 16 in which the catalyst is a powder, granule, pellet or extrudate.

18. The reactor of claim 17 in which the catalyst is a powder and the nominal size of the powder is greater than 125 microns.

19. The reactor of claim 17 in which the catalyst is a granule catalyst having a granule size of about 450 microns.

20. The reactor of claim 12 in which the exhaust cover extends over the one or more than one outlet of the one or more than one cavity.

21. The reactor of claim 10 in which each of the one or more than one cavity has a diameter of at least 1 centimeter.

22. The reactor of claim 10 in which each of the one or more than one cavity has a length of less than 2.5 centimeters.

23. The reactor of claim 10 in which the length of each of the one or more than one cavity corresponds to the length of the chamber block.

24. The reactor of claim 10 including a plurality of cavities in a row by column arrangement.

25. The reactor of claim 24 in which the number of rows equals the number of columns.

26. The reactor of claim 10 including a plurality of cavities in a staggered arrangement.

27. The reactor of claim 13 in which the exhaust cover comprises a continuous single exit manifold interconnected with each of the one or more than one outlet of the one or more than one cavity.

28. A assembly of more than one of the reactors of claim 10 connected in parallel such that the reactant products produced by each reactor are exhausted through a common exit.

29. A reactor system comprising a plurality of the assemblies of claim 28 connected in parallel such that the reactant products produced by each reactor are exhausted through a common exit.

30. A reactor in accordance with claim 10 in which one or more than one cavity in the chamber block is charged with one or more than one catalyst selected from the group of copper-zinc-aluminum; noble metals, platinum, palladium and gold with cerium oxide; transition metal carbides; transition metals nitrides, palladium; palladium alloys, and hydrogen-selective metals.

31. A reactor in accordance with claim 10 in which one or more than one cavity in the chamber block is charged with one or more than one catalyst selected from the group of Fe—Cr—Al and CoMoAl.

32. A reactor in accordance with claim 10 having one or more than one cavity in the chamber block charged with one or more than one catalyst selected from the group of mono-, bi- and poly-metallic alloys and oxides of Group IIIB including rare earth metals, Group IVB, Group VB, Group VIB, Group VIIB, Fe, Co, Ni, Cu, Zn, Cd, noble metals, transition metal groups, alkali metal families, Group IA and Group IIA, Group IIIA, Group IVA, Sb, Te, Bi and Se.

33. The reactor of claim 18 or claim 19 in which the catalyst is selected from one or more than one of the group of mono-, bi-, and poly-metallic alloys and oxides of:

Group IIIB; rare earth metals; noble metals; transition metals: alkali metal families; Group IA; Group IIA; Group IVA; Sb; Te; Bi; and Se.

* * * * *